United States Patent
Zank et al.

(10) Patent No.: US 7,123,143 B2
(45) Date of Patent: Oct. 17, 2006

(54) WIRELESS SIGNATURE MANAGEMENT SYSTEM

(75) Inventors: Anthony E. Zank, Simi Valley, CA (US); Thomas M. Jacques, Santa Paula, CA (US)

(73) Assignee: Topaz Systems, Inc., Simi Valley, CA (US)

( * ) Notice: Subject to any disclaimer, the term of this patent is extended or adjusted under 35 U.S.C. 154(b) by 746 days.

(21) Appl. No.: 10/365,575

(22) Filed: Feb. 11, 2003

(65) Prior Publication Data

US 2004/0156536 A1    Aug. 12, 2004

(51) Int. Cl.
*G08B 1/08* (2006.01)

(52) U.S. Cl. .............................. 340/539.21; 340/539.1; 340/539.13

(58) Field of Classification Search ............. 340/539.1, 340/539.11, 539.13, 539.21
See application file for complete search history.

(56) References Cited

U.S. PATENT DOCUMENTS

| | | | |
|---|---|---|---|
| 5,120,908 A | 6/1992 | Zank et al. | |
| 5,122,623 A | 6/1992 | Zank et al. | |
| 5,133,076 A | 7/1992 | Hawkins et al. | 395/800 |
| 5,191,613 A | 3/1993 | Graziano et al. | 380/25 |
| 5,554,827 A | 9/1996 | Oda | 178/18 |
| 5,892,824 A | 4/1999 | Beatson et al. | 380/25 |
| 5,933,812 A | 8/1999 | Meyer et al. | 705/15 |
| 5,948,103 A | 9/1999 | Fukuzaki | 713/200 |
| 6,021,202 A | 2/2000 | Anderson et al. | 380/25 |
| 6,188,392 B1 | 2/2001 | O'Connor et al. | 345/179 |
| 6,195,446 B1 | 2/2001 | Skoog | 382/119 |
| 6,208,264 B1 | 3/2001 | Bradney et al. | 340/825.31 |
| 6,213,391 B1 | 4/2001 | Lewis | 235/380 |
| 6,307,955 B1 | 10/2001 | Zank et al. | |
| 6,307,956 B1 | 10/2001 | Black | 382/124 |
| 6,401,206 B1 | 6/2002 | Khan et al. | 713/176 |
| 6,510,521 B1 | 1/2003 | Albrecht et al. | 713/193 |
| 6,535,199 B1 | 3/2003 | Canova, Jr. et al. | 345/168 |
| 6,539,101 B1 | 3/2003 | Black | 382/124 |
| 6,572,012 B1 | 6/2003 | Gannon et al. | 235/379 |
| 6,591,002 B1 | 7/2003 | Lee et al. | 382/125 |
| 6,634,560 B1 | 10/2003 | Grabau | 235/492 |
| 6,640,007 B1 | 10/2003 | Niie et al. | 382/188 |
| 6,665,744 B1 | 12/2003 | Shimamoto | 710/15 |
| 6,940,403 B1 * | 9/2005 | Kail, IV | 340/539.12 |
| 2002/0120582 A1 | 8/2002 | Elston et al. | 705/64 |
| 2003/0037004 A1 | 2/2003 | Buffum et al. | 705/51 |
| 2003/0045279 A1 | 3/2003 | Shostak | 455/422 |
| 2003/0089533 A1 | 5/2003 | Lapstun et al. | 178/18.01 |

\* cited by examiner

*Primary Examiner*—Daryl C Pope
(74) *Attorney, Agent, or Firm*—Denton L. Anderson; Sheldon & Mak PC

(57) ABSTRACT

A portable electronic signature system includes a base unit and a wireless remote unit that incorporates graphic tablet digitizer for signaling to a PC of the base unit signature data of a stylus being moved to produce a handwritten signature. The base unit transmits trigger signals for recognition by the remote unit, which also transmits identification signals to the base unit, respective alarms being activated in both the base and remote units in the event that recognition of the identification signals is interrupted by the remote unit being transported out of range. Also disclosed are a method for using the system, a cannister having a wireless alarm for use in a mechanical transport system, and the cannister in combination with a base unit.

45 Claims, 3 Drawing Sheets

WIRELESS SIGNATURE MANAGEMENT SYSTEM

BACKGROUND

The present invention relates to signature management, and more particularly to the utilization of handwritten signatures in connection with commercial transactions.

Handwritten signatures continue to be the basis of many contracts in commerce, such signatures traditionally being on paper documents that set forth terms of transactions; recently, however, there is increasing use of signature tablets by which the signatures are recorded and verified electronically, using so-called e-signature technology. See, for example, U.S. Pat. No. 6,307,955 to Zank et al., which is incorporated herein by this reference. Many point-of-sale terminals now have electronic signature tablets associated therewith, a typical tablet being fixedly mounted a short distance from the terminal proper and connected to a personal computer (PC) of the terminal by a multiple conductor interface cable.

With the increasing popularity and usage of e-signature technology comes the challenge of providing an e-signature tablet that can be used in environments where a standard tablet with a hard connection to a PC is just not practical. One such environment is the drive-up teller window. With a standard tablet, the full conversion of such a facility to e-signature technology does not seem possible. Any kind of a device with a cable at the drive-up window is definitely a safety concern, and anything hard-mounted to the kiosk, so that an individual needs to lean out, is very awkward and not accessible to the handicapped. On the other hand, a wireless connection invites theft or inadvertent transport of the signature tablet from the terminal facility.

Thus there is a need for a portable electronic signature system that is effective, reliable, and easy to use, yet is reasonably secure from theft or inadvertent removal, and that otherwise overcomes the disadvantages of the prior art.

SUMMARY

The present invention meets this need by providing a wireless e-signature tablet that activates base unit and customer alarms in the event that the tablet is transported more than a predetermined distance from the base unit. In one aspect of the invention, a wireless electronic signature management system includes a base unit having a base controller and a wireless base transceiver, the base unit further including a base alarm circuit interfaced to the base controller; a remote unit including a remote controller, a wireless remote transceiver, a signature tablet for receiving a handwritten signature from a user, means for temporarily storing signature data corresponding to the signature in one or both of the remote controller and the signature tablet, and a remote alarm circuit interfaced to the remote controller. The respective transceivers are operative for bidirectional communication between the base controller and the remote controller within a limited range, the base controller being operative for activating the base alarm circuit in response to a defined interruption of communication from the remote unit; means for communicating the signature data from the remote unit to the base unit; and the remote controller being operative for activating the remote alarm circuit in response to a defined interruption of communication from the base unit. The base controller can be implemented for activating the base transceiver to transmit trigger signals that have a first characteristic in response to identification signals being received from the remote transceiver, and a second characteristic in response to non-receipt of the identification signals from the remote transceiver. The remote controller can be implemented for activating the remote transceiver to transmit the identification signals in response to receipt of the trigger signals by the remote transceiver. The transmission of the trigger signals can be periodic, and the remote controller can be implemented for activating transmission of an identification signal in response to each received trigger signal.

Preferably the remote unit has a standby mode in which the remote transceiver is activated during spaced intervals only for reduced power consumption by the remote unit. The remote unit can be provided with a storage compartment having an access door for receiving objects to be transported, and a sensor for signaling a closed condition of the door, and the standby mode can be activated in response to closure of the door. The standby mode can be exited in response to opening of the door. Also, or in the alternative, the standby mode can be activated in response to completion of a signature capture by the signature tablet. Further, the completion of the signature capture can be indicated by closure of the door.

The means for communicating the signature can include means for activating the remote transceiver to transmit the signature to the base transceiver. The means for activating the remote transceiver to transmit the signature can include means for activating the base transmitter to transmit a download command, and means in the remote unit for recognizing the download command.

Also, or in the alternative, the means for communicating the signature can include a docking device for coupling to the remote unit, the docking device being in communication with to the base unit, the remote unit being configured for coupling signature data to the docking device.

In another aspect of the invention, a method for managing transmission of electronic signatures between a transportable device and a transaction facility includes (a) providing a base facility in association with the transaction facility, comprising a base computer having a base transceiver interfaced therewith;

(b) providing a remote unit associated with the transportable device, comprising a remote computer having a remote transceiver interfaced therewith;

(c) activating the base transceiver to transmit trigger signals;

(d) activating the remote transceiver to transmit identification signals;

(e) activating the base transceiver for receiving the identification signals;

(f) activating the remote transceiver for receiving the trigger signals;

(g) activating a remote alarm at the remote unit in response to a defined interruption of communication from the base unit;

(h) activating a base alarm at the base unit in response to a defined interruption of communication from the remote unit;

(i) deactivating the remote alarm and the base alarm in response to restoration of communication between the base and remote units;

(j) capturing a handwritten signature as digital signature data at the remote unit; and (k) transmitting the signature data to the base unit.

The method can also include altering the trigger signals depending on receipt of valid identification signals at the base unit, and wherein the defined interruption of communication from the base unit comprises the alteration of the trigger signals.

In another aspect, the invention provides a canister for use in a mechanical transport system, the canister including a housing defining a compartment for receiving items to be transported; a controller; a wireless transceiver for communicating with a base facility, the transceiver being operative for bidirectional communication between the controller and the base facility within a limited range; an alarm circuit interfaced to the controller; and the controller being operative for activating the alarm circuit in response to a defined interruption of communication from the base unit, and deactivating the alarm circuit in response to a defined restoration of the communication from the base unit. The controller can operative for activating the transceiver to transmit identification signals to the base facility when the canister is within the limited range. The controller can also be operative for activating the transceiver to transmit the identification signals in response to receipt of trigger signals from the base facility by the transceiver. The trigger signals can have a first characteristic when identification signals are being received by the base facility and a second characteristic when the identification signals are not being received by the base facility, the defined interruption of communication comprising, during a predefined period of time non-receipt of the trigger signals, or receipt of trigger signals having the second characteristic. Further, or in the alternative, the controller can be operative to activate transmission of an identification signal in response to each received trigger signal.

Preferably the controller has a standby mode wherein the transceiver is activated during spaced intervals only for reduced power consumption. The canister can also include an access door for the compartment, and a sensor for signaling a closed condition of the door, wherein the standby mode is activated in response to closure of the door. The standby mode can be exited in response to opening of the door.

In a further aspect, the invention provides the combination of a cannister having a housing defining a compartment for receiving items to be transported in a mechanical transport system, and a wireless alarm that includes a base unit having a base controller with a wireless base transceiver and a base alarm circuit interfaced to the base controller; and a remote unit of the cannister, including a remote controller with a wireless remote transceiver and a remote alarm circuit interfaced to the remote controller, the respective transceivers being operative for bidirectional communication between the base controller and the remote controller within a limited range; the base controller being operative for activating the base alarm circuit in response to a defined interruption of communication from the remote unit; and the remote controller being operative for activating the remote alarm circuit in response to a defined interruption of communication from the base unit. The base controller can be operative for activating the base transceiver to transmit the trigger signals having the first and second characteristics that depend on whether the identification signals are being received; the identification signals can be transmitted in response to receipt of the trigger signals by the remote transceiver; and transmission of the trigger signals can be periodic. Also, or in the alternative, the remote controller can activate transmission of an identification signal in response to each received trigger signal.

Preferably the remote unit has the standby mode for reduced power consumption by the remote unit. The cannister can also include an access door for the storage compartment, and a sensor for signaling a closed condition of the door, the standby mode being activated in response to closure of the door. Also, the standby mode can be exited in response to opening of the door.

The combination can further include means for transmitting transaction data between the cannister and the base unit. The means for transmitting transaction data can include means for activating the remote transceiver to transmit the data to the base transceiver, and the means for activating the remote transceiver can include the means for activating the base transmitter to transmit the download command, and the means in the remote unit for recognizing the download command. Alternatively, or in addition, the means for communicating the transaction data can include the docking device that is electrically connected to the base unit, the remote unit being configured for electrically coupling the data through the docking device.

DRAWINGS

These and other features, aspects, and advantages of the present invention will become better understood with reference to the following description, appended claims, and accompanying drawings, where:

DESCRIPTION

Figure 1:
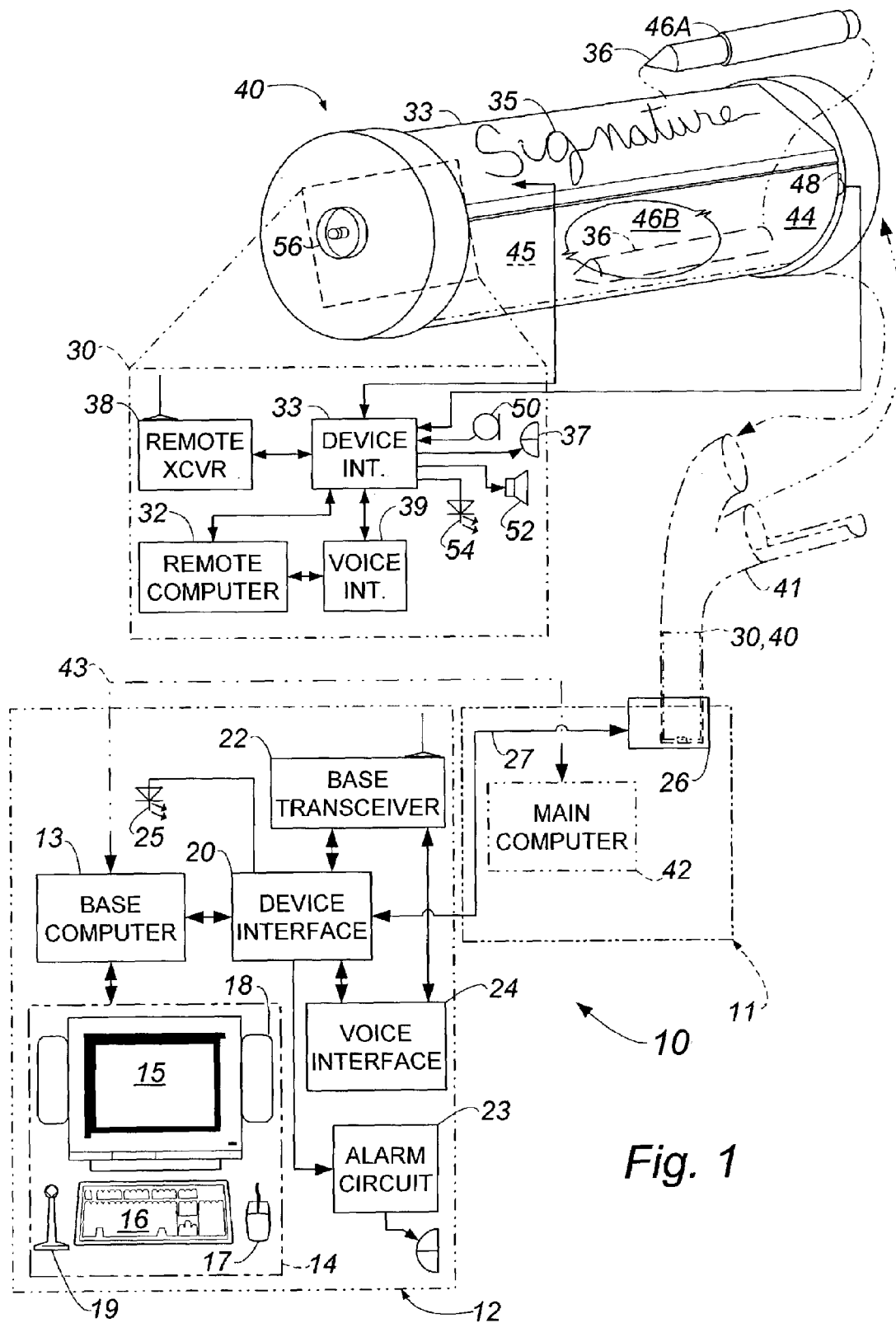
FIG. 1 is a pictorial block diagram of a portable electronic signature management system according to the present invention.

The present invention is directed to a portable computer-based signature management system that is particularly effective, reliable, and resistant to removal of wireless-connected portions thereof. With reference to FIGS. 1–4 of the drawings, a wireless signature system 10 for use in association with a transaction facility 11 includes a base unit 12 having a base computer 13, an operator interface 14 including a screen display 15, a keyboard 16, a pointing device or mouse 17 and, optionally, a pair of base speakers 18 and a base microphone 19. It will be understood that a single base speaker 18 can be employed and that headphones can be substituted, optionally with an included microphone. The base unit 12 also includes a base device interface 20 that is suitably connected to a base indicator (described below), a base transceiver 22, and a base alarm circuit 23 which can include a buzzer and/or a signal output to an external device (not shown). The base unit also includes a base voice interface 24 that is connected to the base transceiver 22 for enabling digital transmissions of analog voice waveforms, and a base indicator 25 for indicating an alarm condition as further described below. Typically, the voice interface is also connected to the base device interface 20 for coupling voice communications via the base transceiver 22 from the base microphone 19 and to the base speakers 18. Alternatively, the coupling can be from and to respective microphone and speakers of the transaction facility 11, the speakers 18 and microphone 19 of the user interface 14, if present, not being used for communication via the base transceiver 22.

The system 10 also includes a remote unit 30 having a remote computer 32 and a remote interface 33 that is suitably connected to a signature tablet 34 for capturing a handwritten signature 35 using a stylus 36, a remote alarm circuit 37, a remote transceiver 38 and, optionally, a remote voice interface 39.

According to the present invention, the remote unit 30 is implemented for repetitively transmitting an identification signal that is recognized by the base unit 11 when the remote unit 30 is not more than a predetermined distance from the base unit 11. Typically, the predetermined distance is a distance beyond which the identification signal is not recognizable by the base unit. Similarly, the base unit 11 repetitively transmits a trigger signal that is recognizable by the remote unit 30 when the remote unit is within the predetermined distance from the base unit. When this bidirectional communication is interrupted in the case of the remote unit being transported out of range, alarms are activated in both the base unit 11 and the remote unit 30. In a preferred exemplary configuration of the system 10, transmission of the identification signal from the remote unit is in response to a periodic trigger signal from the base unit, the form of the trigger signal being dependent on whether the identification signal is being recognized at the base unit 11. (For example, a test bit of the trigger signal can be toggled on or off depending on whether the identification signal is properly received. The toggling can be to alternate states in each cycle for facilitating verification of valid communication based on changed states of the test bit. The test bit can then be reflected back to the base unit as an element of the identification signal for base unit verification of bidirectional communication.)

The remote unit 30 is also implemented for transmitting signature data such as pen position coordinate data to the base unit 11 in a suitable manner as described, for example, in the above-referenced '955 patent. The remote computer 32 and/or the signature tablet 34 has suitable memory associated therewith for temporarily storing signature data, at least during intervals of time that the remote unit 30 is out of range from the base unit 12. Transceivers suitable for use as the base transceiver 22 and the remote transceiver 39 are available as Part No. AC5124C from Aerocomm of Lenexa, Kans.

In the exemplary configuration shown in FIG. 1, the remote unit 30 is installed with the signature tablet 33 in a transportable canister 40 that is configured for use in the transaction facility 11, the facility 11 also including a vacuum transport tube 41 and, optionally, a main computer 42, the main computer 44 preferably having a communication link 43 to the base computer 13. The canister 40 has a conventional door 44 that opens an interior compartment 45, the compartment being used for carrying documents between users (typically customers) and the transaction facility 11, and for storing the stylus 36. Preferably the compartment 15 and the stylus 16 have complementary elements 46A and 46B of a retainer such as a hook-loop fastener affixed thereto for releasably capturing the stylus 36 when it is not in use. Preferably the cannister 42 incorporates a door sensor 48 for signaling whether the door 44 is open or closed.

An additional preferred feature of the remote unit 30 is a docking connector 56 for use with a docking device 26 of the base unit 12 to enable wired or locally wireless communication of data between the remote unit 30 and the base unit 12 when the remote unit is docked relative to the transaction facility 11 as indicated by broken lines in FIG. 1. This arrangement allows the signature data to be transmitted to the base computer 13 using the transceivers 22 and 39, or using a communication link 27 between the docking device and the base device interface 20, depending on circumstances such as the performance of the transceivers 22 and 39, and the need, if any, to provide the signature data to the base unit 12 prior to return of the canister 40 to the transaction facility 11. It will also be understood that the communication link 27 can be the exclusive channel for communicating the signature data, such that the transceivers 22 and 39 can be low cost devices that would not be capable of quickly communicating the signature data. Exemplary low cost transceivers for this purpose utilize what is known as "Bluetooth" technology, a single chip implementation having an effective range of approximately 30 feet being available as BCM2033 from Broadcom of Irvine, Calif. Further, the communication link can be a wired connection or, optionally, it can include a radio transmitter and receiver, or it can utilize infrared technology, depending on factors such as the distance and obstacles between the docking device and the base device interface. In another variation, separate counterparts of the base and remote transceivers 22 and 39 can be used for transmitting the signature data and for monitoring the proximity of the canister 40 with the transaction facility. In this variation, the transceivers monitoring proximity would have an effective range commensurate with appropriate distances that users might be authorized to transport the canister 40, but would need only low bandwidth capability. The transceivers used for signature data transfer would need higher bandwidth capability, but could operate at short range with the canister in close proximity to the transaction facility 11. It is also contemplated that the effective range of devices using the Bluetooth technology might be extended beyond 30 feet, such that there would be fewer instances in which dual communication paths are preferred.

In the exemplary configuration of the remote unit 30, the remote alarm circuit 37 is implemented as a buzzer. The alarm circuit 37 can incorporate a device (not shown) that produces a flashing red "ALARM-RETURN to BASE" or similar indication. Additional devices connected to the device interface 33 include the door sensor 48, a remote microphone 50, a remote speaker 52, and a remote indicator 54 which can be a suitable LED or a device that signals "SIGN NOW". Power for the electronics of the remote unit 30 is provided by suitable batteries (not shown), the batteries being preferably rechargeable by suitable means (also not shown).

The base voice interface and the remote voice interface 39 each include a digital to analog converter (DAC) and an analog to digital converter (ADC). Voice from the base unit 12 is picked up by the base microphone 19 and routed through a PC sound card of the base computer 13 (or by a microphone and pre-amp of the transaction facility 11) and fed through the ADC of the base voice interface 24 to the base transceiver 22. Then from the remote transceiver 38, received digital voice signals are fed the remote voice interface 39 which signals the presence of the digital voice signal to the remote computer 32 which then activates the DAC of the remote voice interface to produce a reconstituted analog voice waveform that is amplified in the remote device interface 33 and delivered to the remote speaker 52. For voice from the remote unit 30 to the base unit 12, this process is reversed. It will be understood that the operator interface 14 can include a subset only of the above-described components thereof. Also, either or both of the device interfaces 20 and 33 can be integrated with the respective computers 12 and 32.

Figure 2:
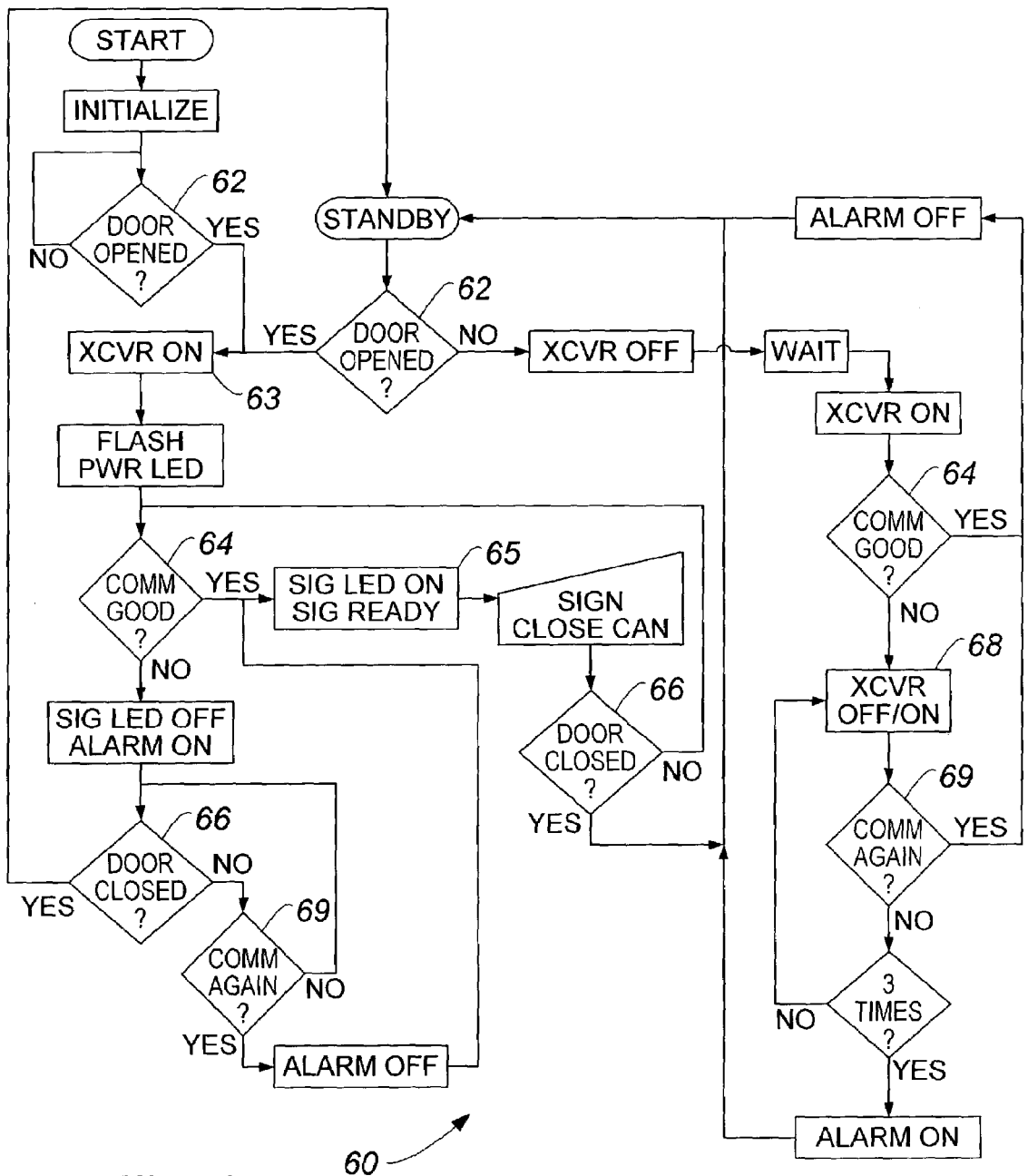
FIG. 2 is a flow chart of a computer process for signature capture and transmission from a remote unit of the system of FIG. 1.

With particular reference to FIG. 2, a remote computer process 60 with which the remote computer 32 is programmed includes, following power-up and initialization, a test door open step 62 determines whether the door 44 has been opened as indicated by the door sensor 48. If so, the transceiver 38 is turned on in a transceiver on step 63 and the remote LED 54 (or a separate optional power LED, not shown) is flashed. (It will be understood that some or all of the initialization can be performed following the positive result of the test door open step 62.) Then, communication with the base unit is tested in a test communication step 64, by determining whether a trigger signal of the proper form is being received from the base transceiver 22. If so, the signature tablet 34 is initialized and/or activated and the remote LED 54 is powered for signaling to the user that the tablet 34 is ready to receive the signature 35, in a ready signature step 65. As the user proceeds to provide the signature and then close the door 44, control is passed to a test door closed step 66, returning to the test communication step 64 repeatedly as long as the door 44 remains open while communication with the base unit 12 is also monitored. Signature data corresponding to the signature 35 can be communicated to the base unit 12 either during making of the signature, upon completion of the signature, or thereafter as further described below.

When the door 44 is eventually closed (while communication remains good), the remote unit 30 enters a standby condition, the remote transceiver 38 being turned off (a counterpart of the test door open step 62 being interposed for terminating the standby condition as described below, it being presumed that the door 44 is still closed). In implementations having transmission of the signature data upon completion of the signature, closure of the door 44 can signify completion of the signature, whereupon the signature data is transmitted to the base unit 12 using the transceivers 22 and 38 immediately prior to entry of the standby mode. Other methods for signifying completion of the signature include passage of a predetermined interval on the order of 5 seconds with no further signature activity by the user.

In the standby mode, after a wait interval of perhaps 15 seconds, the remote transceiver 38 is powered (momentarily) for verifying continued communication with the base unit 13, in a counterpart of the test communication step 64. If so, the standby mode maintained, control passing to the counterpart test door open step 62, further described below, the standby mode providing greatly reduced power consumption by the remote unit 30. If the counterpart test communication step 64 produces a negative result during the standby mode, the remote transceiver 38 is cycled off then on again in an interrupt transceiver step 68, and reestablishment of communication is determined in a test reconnect step 69. If not, the recycling of the remote transceiver is repeated up to two more times. If the communication is not reestablished within three cycles, the alarm is turned on, the remote unit 30 remaining in standby mode as long as the door 44 remains closed, the remote transceiver again being turned off for the wait interval, after which the counterpart test communication step 64 is repeated. In accordance with the above description, the verification of communication by the remote unit 30 can include testing whether the trigger signals are being received from the base unit 12, and further verifying that the trigger signals are characteristic of the identification signals being properly received from the remote unit by the base unit.

In the standby mode, whenever the result of either the counterpart test communication step 64 or the test reconnect step 69 is positive, the alarm is deactivated (if activated), the remote unit remaining in the standby mode until the door 44 is opened (as determined in the counterpart test door open step 62). Optionally, the remote unit 30 can signal availability of the signature data to the base unit 12, which can then or at a later time transmit a signal (such as the trigger signal having a corresponding characteristic) to the remote unit to begin downloading the signature data. In this implementation, the signal to begin downloading is typically received during the standby mode when the transceiver is deactivated for periods as long as the wait interval. To insure recognition of the signal to begin downloading, the trigger signals can be transmitted with the corresponding characteristic for longer than the wait interval or until acknowledged by the remote unit. Also, the remote transceiver can be maintained activated for sufficient time to complete transmission of the signature data, whereupon the standby mode is resumed as described above.

When the door 44 is opened during the standby mode, control is returned to the transceiver on step 63, described above, and the process for obtaining another signature is repeated as described above. However, when the result of the test communication step 64 (prior to the ready signature step 65) is negative, the remote LED is turned off (if powered) and the alarm is activated, control passing to a counterpart of the test door closed step 66. If the door 44 remains open, control passes to a counterpart of the test reconnect step 69, the alarm remaining activated while the counterpart steps 66 and 69 are repeated. If the door is closed while the alarm is on, the remote unit is placed in the standby mode for monitoring possible reestablishment of communication with the base unit 13. If communication ie reestablished before the door 44 is closed, the alarm is deactivated and control is passed (or returned) to the ready signature step 65. Thus the remote unit 30 provides for capturing the user's signature 35 while communication with the base unit 13 is maintained, activating the alarm when communication is interrupted, and deactivating the alarm when communication is restored, using the standby condition to conserve transceiver power when the door 44 is closed, and when the alarm is activated.

Figure 3:
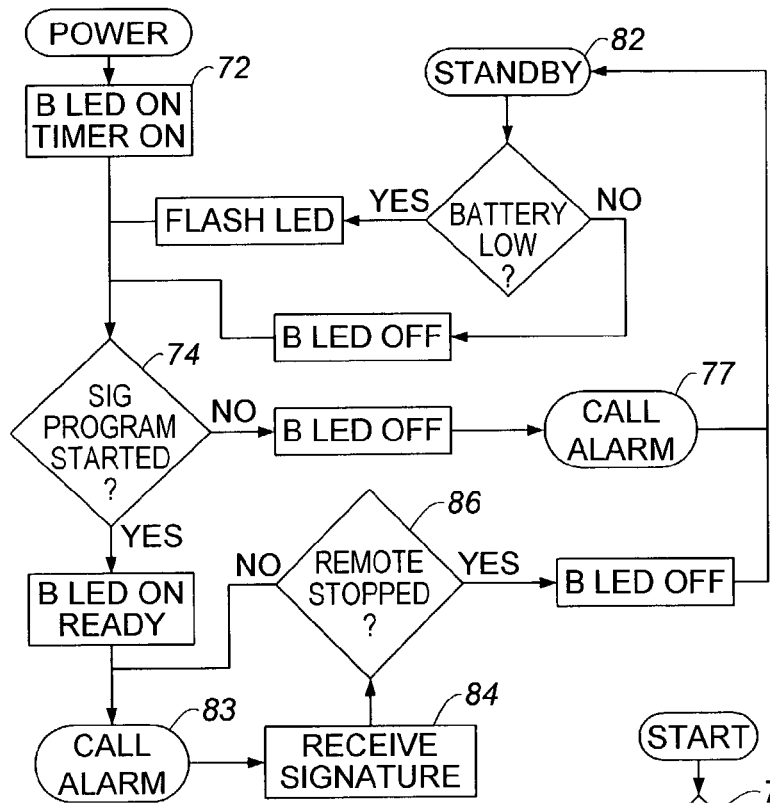
FIG. 3 is a flow chart of a computer process for receiving the signature at a base unit portion of the system of FIG. 1.
Figure 4:
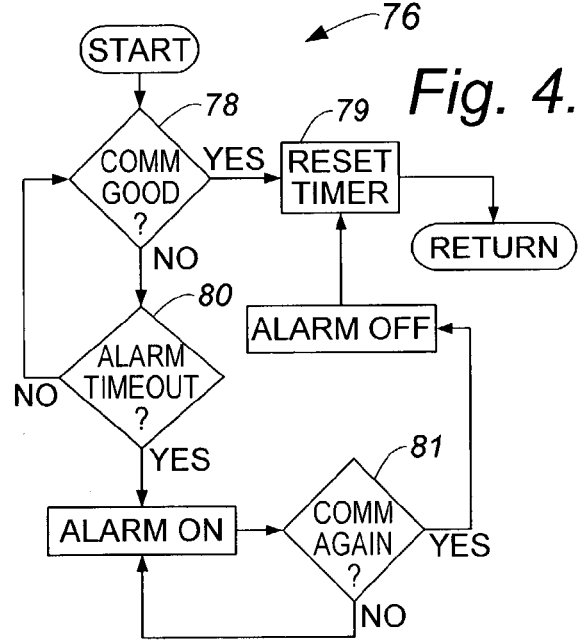
FIG. 4 is a flow chart of an alarm service portion of the process of FIG. 3.

With particular reference to FIGS. 3 and 4, a base computer process 70 with which the base computer is programmed includes, following application of power, an initialize step 72 is performed in which the base indicator 25 is activated and a base alarm timer is set and activated. Then a determination of whether signature management software of the signature system has been started (ready to accept a signature) is performed in a test ready step 74. Typically, the signature management software, which can implement features described in the above-referenced '955 patent, is started by mouse-clicking on a start button being displayed on the screen display 15. This step makes the base unit ready to accept a signature whether or not the remote unit is ready to accept one. If the software is not started, the base indicator is deactivated and an alarm service routine 76 is invoked in a call alarm step 77. (The service routine 76 is shown as a subroutine for convenience, in that separate portions of the process 70 incorporates the same steps.)

In the alarm service routine 76, a test communication step 78 first determines whether the identification signals are being properly received from the remote unit 30; if so, the base alarm timer is reset in a reset timer step 79 and control is returned to the calling location of the process 70. If the communication link is found not to be good, a test timeout step 80 determines whether this condition has persisted beyond a predetermined interval, typically 45 seconds as discussed further below, the base alarm circuit 23 is activated; otherwise, control is returned to the test communication step 78. Following activation of the base alarm circuit 23, a test reconnect step 81 determines whether there has been a resumption of communications. If so, the base alarm circuit 23 is deactivated and control is returned to the reset timer step 79; otherwise, the test reconnect step 81 is repeated with the alarm on until such time as communication with the remote unit is reestablished.

Upon return to the call alarm step 77 location (which occurs only when there is good communication with the remote unit 30), the base computer process 70 enters a standby condition 82, the base indicator 25 being turned off.

Upon a positive result from the test ready step 74, the base indicator 25 is activated (if it had been deactivated previously) and the alarm service routine 76 is invoked in a call alarm step 83, and upon a successful return (communication good), the signature data is downloaded in a receive signature step 84. As described above, the signature data can be received as it is generated or following completion of the signature 35, control being passed to a test stop step 86 for determining whether the signature management software has been terminated (such as by mouse-clicking on a displayed stop button), in which case the base indicator 25 is deactivated and the standby condition 82 is entered; otherwise, control is returned to the call alarm step 83 in preparation for receiving another set of signature data. It will also be understood that the receive signature step 84 can be implemented for receiving a portion only of the signature data, the step 84 being repeated as needed for receiving a full set of the signature data.

As described above, the base alarm timer has an exemplary timeout interval of 45 seconds. This is consistent with the standby mode of the remote unit 30 in which the remote transceiver 39 is activated at intervals of 15 seconds for from approximately 0.25 second to approximately 1.5 seconds to verify communication with the base unit 12. The 15 second intervals advantageously facilitates providing battery power to permit effective use of the remote unit 30 for at least one day, while also limiting the distance that the remote unit could be taken away from effective communications range before the alarm would be activated. An additional consideration is that the metal used in typical implementations of the transport tube 41 acts as a shield to prevent communication with the base unit 12 for perhaps 15 seconds. Consequently, it is preferred that there be no activation of either the base alarm circuit 23 or the remote alarm circuit 37 if there is no communication for the first 15 seconds. A further consideration is that if the base unit timer starts right after a communication, it will run for another 15 seconds before the next communication. The remote transceiver is activated at the 15 second interval; if it sees no communication, and this is verified in the three cycles of the test reconnect step 69 of the remote computer process of FIG. 2, up to an additional 1.5 seconds can elapse, a total of 19.5 seconds. Allowance is made for this sequence to be completed twice, taking nearly 40 seconds, and further allowance for the time of communication which can vary depending on distance. The above considerations assume that the canister 40 is not actually being used. If the door 44 is opened when the canister 40 is out of range, the remote alarm circuit 37 is activated within 2 or 3 seconds notwithstanding the 45 second delay in activation of the base alarm circuit 23. This is because the remote computer process 60 executes the test communication step 64 substantially immediately following detection of initial opening of the door 44 at the test door open step 62 following power-up. If the canister 40 is out of range, the identification signals from the remote unit 30 are interrupted, and the trigger signals consequently are not toggled or otherwise characteristic of good communications between the base and remote units.

Thus the base unit 12 produces the trigger signals as a pulse train that is kept alive by reflection from the remote unit 30 back to the base unit, and both units activate respective alarms in response to interruption of the communication and also reset the alarms in response to restoration of communication.

Although the present invention has been described in considerable detail with reference to certain preferred versions thereof, other versions are possible. For example, the base computer 13 can communicate with multiple remote units 30 using corresponding counterparts of the base device interface 20 and base transceiver 22, each pair of transceivers 22 and 39 operating on frequencies (channels) different than those of other such pairs. Security can be provided using a unique system identification number that is programmed into each base unit 12 or group of base units in which each pair of transceivers has a different channel number. Moreover, other transaction data beside the signature data can be transmitted (in either direction) between the base and remote units, whether or not the signature tablet 34 is included. Therefore, the spirit and scope of the appended claims should not necessarily be limited to the description of the preferred versions contained herein.

What is claimed is:

1. A wireless signature management system comprising:
   (a) a base unit comprising a base controller and a wireless base transceiver, the base unit further comprising a base alarm circuit interfaced to the base controller;
   (b) a remote unit comprising:
      (i) a remote controller;
      (ii) a wireless remote transceiver, the respective transceivers being operative for bidirectional communication between the base controller and the remote controller within a predetermined distance;
      (iii) a signature tablet for receiving a handwritten signature from a user;
      (iv) means for temporarily storing signature data corresponding to the signature in one or both of the remote controller and the signature tablet; and
      (v) a remote alarm circuit interfaced to the remote controller;
   (c) the base controller being operative for activating the base alarm circuit in response to a defined interruption of communication from the remote unit;
   (d) means for communicating the signature data from the remote unit to the base unit; and
   (e) the remote controller being operative for activating the remote alarm circuit in response to a defined interruption of communication from the base unit.

2. The system of claim 1, wherein the base controller is operative for activating the base transceiver to transmit trigger signals, the trigger signals having a first characteristic in response to identification signals received from the remote transceiver by the base transceiver, and a second characteristic in response to non-receipt of the identification signals from the remote transceiver.

3. The system of claim 2, wherein the remote controller is operative for activating the remote transceiver to transmit the identification signals in response to receipt of the trigger signals by the remote transceiver.

4. The system of claim 3, wherein transmission of the trigger signals is periodic.

5. The system of claim 3, wherein the remote controller activates transmission of an identification signal in response to each received trigger signal.

6. The system of claim 1, wherein the remote unit has a standby mode wherein the remote transceiver is activated during spaced intervals only for reduced power consumption by the remote unit.

7. The system of claim 6, the remote unit further comprising a storage compartment having an access door for receiving objects to be transported therein, and a sensor for signaling a closed condition of the door, wherein the standby mode is activated in response to closure of the door.

8. The system of claim 7, wherein the standby mode is exited in response to opening of the door.

9. The system of claim 6, wherein the standby mode is activated in response to completion of a signature capture by the signature tablet.

10. The system of claim 9, the remote unit further comprising a storage compartment having an access door for receiving objects to be transported therein, and a sensor for signaling a closed condition of the door, wherein the completion of the signature capture is indicated by closure of the door.

11. The system of claim 1, wherein the means for communicating the signature comprises means for activating the remote transceiver to transmit the signature to the base transceiver.

12. The system of claim 11, wherein the means for activating the remote transceiver to transmit the signature comprises means for activating the base transmitter to transmit a download command, and means in the remote unit for recognizing the download command.

13. The system of claim 1, wherein the means for communicating the signature comprises a docking device for coupling to the remote unit, the docking device being electrically connected to the base unit, the remote unit being configured for electrically coupling signature data to the docking device.

14. A method for managing transmission of electronic signatures between a transportable device and a transaction facility, comprising:
(a) providing a base facility in association with the transaction facility, comprising a base computer having a base transceiver interfaced therewith;
(b) providing a remote unit associated with the transportable device, comprising a remote computer having a remote transceiver interfaced therewith;
(c) activating the base transceiver to transmit trigger signals;
(d) activating the remote transceiver to transmit identification signals;
(e) activating the base transceiver for receiving the identification signals;
(f) activating the remote transceiver for receiving the trigger signals;
(g) activating a remote alarm at the remote unit in response to a defined interruption of communication from the base unit;
(h) activating a base alarm at the base unit in response to a defined interruption of communication from the remote unit;
(i) deactivating the remote alarm and the base alarm in response to restoration of communication between the base and remote units;
(j) capturing a handwritten signature as digital signature data at the remote unit; and
(k) transmitting the signature data to the base unit.

15. The method of claim 14, further comprising altering the trigger signals depending on receipt of valid identification signals at the base unit, and wherein the defined interruption of communication from the base unit comprises the alteration of the trigger signals.

16. A canister for use in a mechanical transport system, the canister comprising:
(a) a housing defining a compartment for receiving items to be transported;
(b) a controller;
(c) a wireless transceiver for communicating with a base facility, the transceiver being operative for bidirectional communication between the controller and the base facility within a predetermined distance;
(d) an alarm circuit interfaced to the controller; and
(e) the controller being operative for:
(i) activating the alarm circuit in response to a defined interruption of communication from the base unit; and
(ii) deactivating the alarm circuit in response to a defined restoration of the communication from the base unit.

17. The canister of claim 16, wherein the controller is operative for activating the transceiver to transmit identification signals to the base facility when the canister is within the predetermined distance.

18. The canister of claim 17, wherein the controller is operative for activating the transceiver to transmit the identification signals in response to receipt of trigger signals from the base facility by the transceiver.

19. The canister of claim 18, wherein the trigger signals can have a first characteristic when identification signals are being received by the base facility and a second characteristic when the identification signals are not being received by the base facility, the defined interruption of communication comprising, during a predefined period of time:
(a) non-receipt of the trigger signals; or
(b) receipt of trigger signals having the second characteristic.

20. The canister of claim 18, wherein the controller activates transmission of an identification signal in response to each received trigger signal.

21. The canister of claim 16, wherein the controller has a standby mode wherein the transceiver is activated during spaced intervals only for reduced power consumption.

22. The canister of claim 21, further comprising an access door for the compartment, and a sensor for signaling a closed condition of the door, wherein the standby mode is activated in response to closure of the door.

23. The canister of claim 22, wherein the standby mode is exited in response to opening of the door.

24. In combination, a cannister having a housing defining a compartment for receiving items to be transported in a mechanical transport system, and a wireless alarm comprising:
(a) a base unit comprising a base controller and a wireless base transceiver, the base unit further comprising a base alarm circuit interfaced to the base controller;
(b) a remote unit of the cannister, comprising:
(i) a remote controller;
(ii) a wireless remote transceiver, the respective transceivers being operative for bidirectional communication between the base controller and the remote controller within a predetermined distance; and
(iii) a remote alarm circuit interfaced to the remote controller;

(c) the base controller being operative for activating the base alarm circuit in response to a defined interruption of communication from the remote unit; and (d) the remote controller being operative for activating the remote alarm circuit in response to a defined interruption of communication from the base unit.

25. The combination of claim 24, wherein the base controller is operative for activating the base transceiver to transmit trigger signals, the trigger signals having a first characteristic in response to identification signals received from the remote transceiver by the base transceiver, and a second characteristic in response to non-receipt of the identification signals from the remote transceiver.

26. The combination of claim 25, wherein the remote controller is operative for activating the remote transceiver to transmit the identification signals in response to receipt of the trigger signals by the remote transceiver.

27. The combination of claim 26, wherein transmission of the trigger signals is periodic.

28. The combination of claim 26, wherein the remote controller activates transmission of an identification signal in response to each received trigger signal.

29. The combination of claim 24, wherein the remote unit has a standby mode wherein the remote transceiver is activated during spaced intervals only for reduced power consumption by the remote unit.

30. The combination of claim 29, the cannister further comprising an access door for the storage compartment, and a sensor for signaling a closed condition of the door, wherein the standby mode is activated in response to closure of the door.

31. The combination of claim 30, wherein the standby mode is exited in response to opening of the door.

32. The combination of claim 24, further comprising means for transmitting transaction data between the cannister and the base unit.

33. The combination of claim 32, wherein the means for transmitting transaction data comprises means for activating the remote transceiver to transmit the data to the base transceiver.

34. The combination of claim 33, wherein the means for activating the remote transceiver to transmit the data comprises means for activating the base transmitter to transmit a download command, and means in the remote unit for recognizing the download command.

35. The combination of claim 24, wherein the means for communicating the transaction data comprises a docking device for coupling to the remote unit, the docking device being electrically connected to the base unit, the remote unit being configured for electrically coupling the data through the docking device.

36. A wireless data management system comprising:
(a) a base unit comprising a base controller and a wireless base transceiver; and
(b) a wireless remote unit comprising a remote controller and a wireless remote transceiver, the base transceiver and the remote transceiver being operative for communication between the base controller and the remote controller;
wherein the remote unit is adapted to capture transaction data from a user while wireless communication between the remote unit and the base unit is established and to prevent capturing transaction data from a user when communication between the remote unit and the base unit is interrupted.

37. The system of claim 36, wherein the remote unit is adapted to transmit transaction data to the base unit as it is generated.

38. The system of claim 36, wherein the remote unit comprises a memory for temporarily storing transaction data.

39. The system of claim 38, wherein the memory is contained in the controller.

40. The system of claim 36, additionally comprising a housing defining a compartment in the remote unit for receiving items to be transported.

41. The system of claim 36, wherein the remote controller activates a remote indicator that the remote unit is ready to receive transaction data.

42. The system of claim 41, wherein the remote indicator comprises a LED.

43. A wireless data management system comprising:
(a) a base unit comprising a base controller and a wireless base transceiver; and
(b) a wireless remote unit comprising a remote controller and a wireless remote transceiver, the base transceiver and the remote transceiver being operative for communication between the base controller and the remote controller;
wherein the remote unit is adapted to capture transaction data from a user while wireless communication between the remote unit and the base unit is established and to prevent capturing transaction data from a user when communication between the remote unit and the base unit is interrupted; and
wherein the remote unit comprises a signature tablet, and wherein the transaction data is signature data.

44. The system of claim 43, wherein the remote controller activates a remote indicator that the signature tablet is ready to receive a signature.

45. The system of claim 44, wherein the remote indicator comprises a LED.

* * * * *